United States Patent [19]

Osta

[11] 4,297,967
[45] Nov. 3, 1981

[54] DEVICE FOR APPLYING AN OPERATING PRESSURE TO A ROLLER

[76] Inventor: Francesco Osta, 3, via Spanzotto, I-15033 Casale Monferrato, Italy

[21] Appl. No.: 112,320

[22] Filed: Jan. 15, 1980

[30] Foreign Application Priority Data

Feb. 2, 1979 [IT] Italy .............................. 67228 A/79

[51] Int. Cl.³ .......................................... B05C 11/02
[52] U.S. Cl. ................................... 118/117; 100/170
[58] Field of Search .............. 100/47, 160, 164, 168, 100/169, 170, 171, 176; 118/114, 115, 116, 117, 249

[56] References Cited

U.S. PATENT DOCUMENTS

| 3,150,002 | 9/1964 | Justus | 118/249 |
| 3,332,260 | 7/1967 | Bisang | 100/170 X |
| 3,566,773 | 3/1971 | Chadwick, Jr. | 100/169 X |
| 3,707,909 | 1/1973 | Volkers | 100/170 X |

FOREIGN PATENT DOCUMENTS 1020862 12/1957 Fed. Rep. of Germany ...... 118/117

Primary Examiner—Peter Feldman
Attorney, Agent, or Firm—Young & Thompson

[57] ABSTRACT

A device for applying an operating pressure to a roller, especially the counterroller of a unit for spreading a thin layer of material onto a strip, wherein the roller is mounted on support levers by means of eccentric bushings to which are connected pressure applying means operating by rotating the said bushings. The operating pressure is applied to the roller without involving displacements of the support levers, whose position is stationary during operation. Preferably, bars are connected to said bushings, and these bars carry at one end a counterweight, whereas the other ends thereof are connected to pneumatic cylinders, feeded through pressure adjusters, for applying the operating pressure to the roller.

10 Claims, 4 Drawing Figures

DEVICE FOR APPLYING AN OPERATING PRESSURE TO A ROLLER

BACKGROUND OF THE INVENTION

The present invention relates to a device intended to allow applying a measurable pressure, pre-established within strict tolerances, onto an operating roller. This device can find particular, but not exclusive, application in exerting an operating pressure onto the counterroller or pressure roller of a spreading unit.

The thickness of the material layer spread onto a strip by means of a spreading unit depends mainly on the distance between the facing cyclindrical surfaces of the spreading roller and the counterroller or pressure roller of the spreading unit and hence, the other conditions being equal, on the pressure with which the counterroller is pushed towards the spreading roller. To control and to determine in advance the thickness of the material to be spread, it is a common practice to use mechanical stops intended to pre-establish the position of the counterroller, or manometers which measure the feeding pressure of air cylinders by means of which the counterroller is pushed towards the spreading roller. However, these devices allow measuring, and hence pre-establishing, the working conditions only in an approximate manner, both because of the large inertial masses involved and the presence of variable clearances and frictions.

The insufficiency of the known devices appears especially in spreading very thin layers, as for example in spreading silicones without solvents, where the application of a layer from 0.5 to 1.5 grammes per square meter, corresponding to a thickness from 0.5 to 1.5 micrometers, is required. Since it is not practically possible to directly measure either the mass or the thickness of the material applied in such a thin layer onto the strip which is being produced, these values can be determined only after application, by calculating them on the basis of the knowledge of the strip surface on which the material has been spread and the mass of material consumed in the course of the operation. Therefore, it becomes very important, to the effects of repeatability of the working conditions, to know and predetermine with considerable precision the pressure exerted onto the pressure roller of the spreading unit.

BRIEF SUMMARY OF THE INVENTION

The object of the present invention is to provide a device for applying the operating pressure onto a roller, such as the pressure roller of a spreading unit, which device should be capable of allowing to determine the value of the pressure actually applied onto the roller, in a more precise way as compared with the known devices.

This object is attained, according to the invention, mainly by the fact that between the roller and its support means there is interposed an eccentric bushing having connected thereto the means for applying the working pressure.

Thanks to this arrangement, it is possible to obtain a large multiplication of the force applied onto the roller with respect to the force produced by the pressure application means, so that this latter force, which is of moderate value, may more easily be measured and pre-established. At the same time, since the multiplier device is disposed between the roller and its support means, the suspended mass is reduced to little more than the mass of the roller alone, with exclusion of the support means thereof, thus reducing the importance of the problems arising from the amount of inertial mass involved.

Preferably, connected to the said eccentric bushing there is also a lever with an adjustable counterweight, which lever serves to balance the weight of the roller, and the bushing itself is mounted relative to the support means with the aid of roller bearings, these arrangements providing an efficient contribution to the sensitivity and precision of the device.

BRIEF DESCRIPTION OF THE DRAWINGS

These and other features of the device according to the present invention will appear more clearly from the following description of an embodiment, given by way of non limiting example, shown in the accompanying drawings, in which.

DETAILED DESCRIPTION OF A PREFERRED EMBODIMENT

Figure 3:
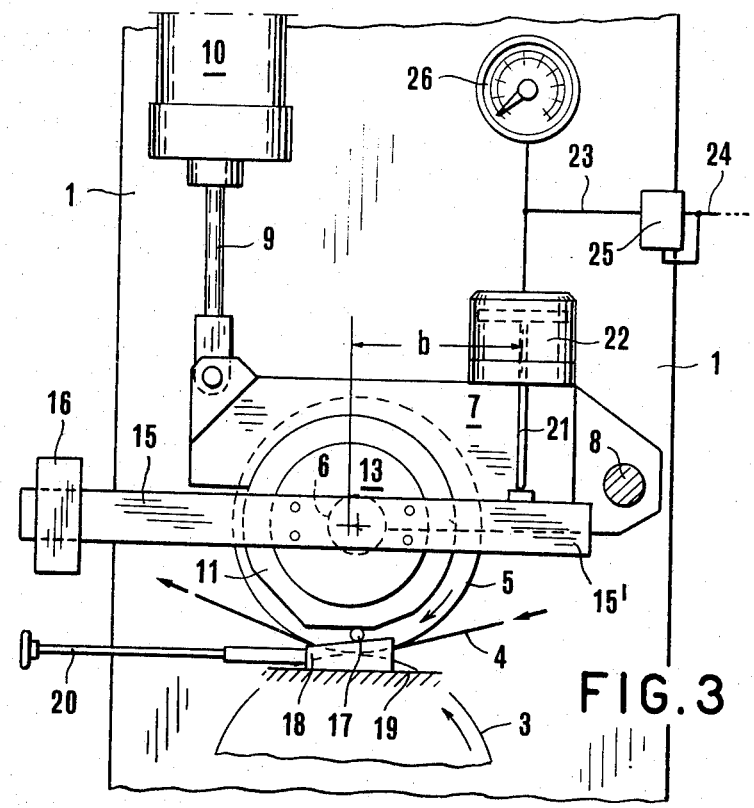
FIG. 3 is a side elevational view showing the unit of FIG. 1 on a somewhat enlarged scale and in a working condition, a part of the structure having being removed.

The invention will now be described with reference to its application, by way of example, to a unit for spreading silicones without solvent.

Reference numeral 1 indicates the structure of the spreading unit, which structure supports a shaft 2 having mounted thereon a spreading roller 3. A strip 4 to be treated is made to travel on the roller 3. The shaft 2 is connected, in a well-known manner, to motor means (not shown) in order to put into rotation the spreading roller 3. This latter cooperates, again in a well-known manner, with means (not shown) for feeding the material intended to be spread on the strip 4.

Cooperating with the spreading roller 3 there is a counterroller or pressure roller 5, whose shaft 6 is supported by side support levers 7. Said levers 7 are pivoted at 8 onto the structure 1 and are connected to the rods 9 of the pistons of air cylinders 10, connected to the structure 1.

The parts described so far are substantially known. In the prior art devices, the shaft 6 of the pressure roller 5 is directly supported by the levers 7, and for the adjustment of the working conditions, either the support levers 7 cooperate with adjustable stops serving to determine (without taking into account the clearances) the distance between the rollers 3 and 5 in the nip in which the strip 4 passes, or the cylinders 10 are fed with a pressure adjusted in such a manner as to apply to the counterroller 5 (without taking into account the frictions) the correct working pressure.

Conversely, in the device according to the present invention, each support lever 7 carries a flange 11, in which there is mounted in a freely rotatable manner, by means of a roller bearing 12, a bushing 13. The bushing 13 eccentrically supports another roller bearing 14, in which the shaft 6 of the pressure roller 5 is supported. In the normal working position, the bushing 13 is oriented in such a way that the eccentricity e between the bearings 12 and 14 is directed almost horizontally. Fixed to each bushing 13 there is an almost horizontal bar 15 which, on its portion remote from the centre of bearing 14, supports an eventually adjustable counterweight 16. The counterweights 16 are determined and, if necessary, adjusted in such a way as to compensate for the weight of the pressure roller 5 and its annexes, so that the whole assembly comprising the pressure roller 5, its shaft 6, its bearings 14, the eccentric bushing 13, the bars 15, the counterweights 16, and any other part normally connected thereto, results in being balanced relative to the centre of the bearings 12 and of the bushings 13, and may swing about said centre. The said assembly can swing substantially without noticeable resistance, thanks to the presence of the roller bearings 12. As it can be appreciated, due to the presence of the substantially horizontal eccentricity e, such swinging gives rise to a slight movement of the pressure roller 5 towards and away from the spreading roller 3, with the support levers 7 remaining stationary.

Each of the flanges 11 of the levers 7 has a stop 17 arranged to bear against a wedge-shaped stop block 18. This stop block rests on a bracket 19 of the structure 1, and it is adjustable in position by means of a drive 20.

Finally, the arm 15' of each bar 15, opposite the counterweight 16, cooperates with the rod 21 of an air cylinder 22 (preferably of the type having a flexible diaphragm), and the cylinder 22 is connected by a pipe 23 to a compressed air conduit 24, through a pressure reducer-adjuster device 25. The feeding pressure of the cylinder 22 is indicated with considerable precision by a pressure gauge 26.

Figure 1:
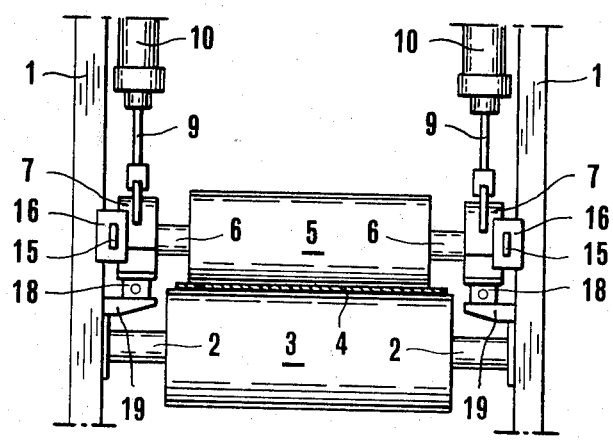
FIG. 1 is a front elevational view, on a reduced scale, showing a portion of a spreading unit provided with the device according to the present invention.
Figure 2:
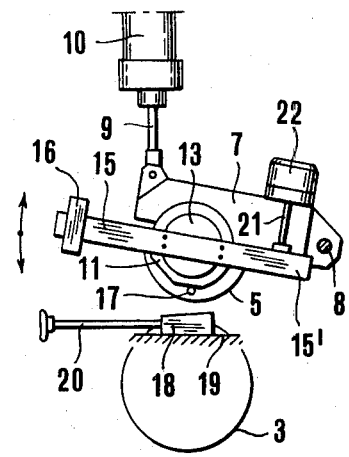
FIG. 2 is a side elevational diagrammatic view, showing the main parts of the unit of FIG. 1 in a non operating condition.
Figure 4:
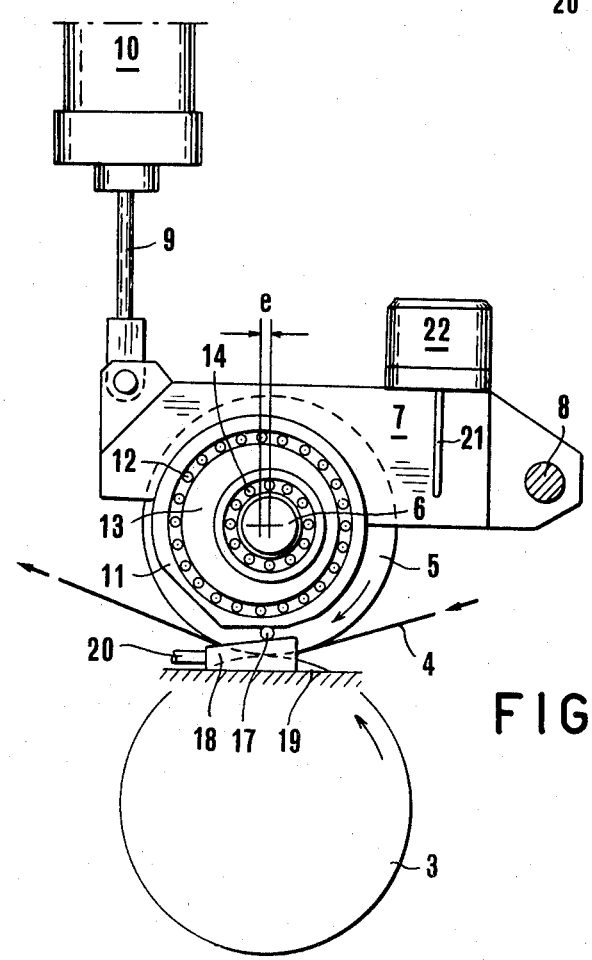
FIG. 4 is a somewhat diagrammatic view similar to that of FIG. 3, with some parts removed to allow representation of the component parts situated behind them.

In the device according to the invention, the cylinders 10 have the only function of allowing the displacement of the pressure roller 5, with all its annexes, between a rest position (FIG. 2) and a working position (FIGS. 1, 3 and 4). In the working position, the stop 17 abuts against the stop block 18 and fixes the position of the support levers 7, which then remain stationary; to this end, the cylinders 10 and their feeding pressure are chosen in such a way as to exert on the levers 7, in any operating condition, a downwardly directed force which is higher than the upwardly directed force caused by the reaction of the pressure exerted by the pressure roller 5 onto the strip 4. The adjustable block stops 18 are lined-up in such a way that, in the working position of the support levers 7 and with the bars 15 in a horizontal position, the pressure roller 5 results in being situated approximately at the correct distance from the spreading roller 3.

Thus, the working pressure is applied onto the pressure roller 5 by means of the diaphragm cylinder 22; the force exerted by this latter is transmitted to the pressure roller multiplied by the ratio b/e between the arm b of the bar 15-15' and the eccentricity e of the bushing 13. This ratio may be considerably high and, consequently, the dimensions and the feeding pressure of the cylinder 22 may be reduced, which turns to the advantage of an accurate adjustment, carried out by means of the reducer-adjuster device 25, and controlled by means of the pressure gauge 26. Since the weight of the movable parts is balanced by the counterweight 16, the force thus applied onto the pressure roller is the effective force with which the said roller is applied againt the strip 4. Therefore, once the feeding pressure of the cylinders 22, to which a correct spreading correspondes, has been determined experimentally, the repeatability of the optimal conditions is ensured by a simple suitable adjustment of the said pressure in the successive operations.

The thus obtained force of application of the roller is completely independent from the possible differences in the feeding pressure of the cylinders 10 or in the position of the stop blocks 18, and from the variations in the friction, especially at the fulcra 8, which are subjected to very high loads. Furthermore, little disturbance to the adjustment derives from phenomena of inertia, since the large mass of the support levers 7 is stationary and the suspended masses are reduced to a minimum. Also, possible clearances of the movable parts do not affect the force with which the pressure roller is applied against the strip being treated.

Obviously, various modifications may be made to what has been described hereinabove and shown in the drawings with the only purpose of explaining the concepts of the invention. For example, the diaphragm air cylinder 22 may be replaced by any other source of force capable of being accurately adjusted, which source may be of pneumatic, oleodynamic, electric or mechanical nature. Also the cylinders 10 may be substituted by pneumatic, oleodynamic, electric or mechanical sources of force, without requiring a precise adjustment. The balancing of the pressure roller by means of the counterweight 16, which balancing is useful because it allows an easy calculation of the force applied to the pressure roller, could also be only partial, or even missing, if provision is suitably made for taking into account the weight of the pressure roller and its annexes in addition to the force applied by the source of force 22. The stops 17 cooperating with the stop blocks 18 could be replaced by any other means for determining, on the other hand without strict requirements of precision, the working position of the levers 7.

These and other modifications, and any replacement of technical equivalents, may be made to the device described and illustrated herein, without departing from the scope of the present invention.

The device according to the present invention may be applied in newly-planned machines, but, because of not having to modify the structure of the machine, the support levers and their actuating means, the same device can also advantageously used for the transformation of existing spreading units.

Finally, although specific reference has been made herein to the spreading of silicones without solvents, it is to be intended that the device according to the invention may advantageously be applied in the general field of spreading of inks, varnishes, adhesives and other substances, especially on very thin supports, inasmuch as it improves the working conditions and the repeatability of the operations. Furthermore, even out of the field of spreading, the present invention may find application in any arrangement of rollers in which it is desirable to have the possibility of applying with precision on adjustable and repeatable pressure.

Having thus described my invention, what I claim is:

1. A device for applying operating pressure to a roller, comprising a structure, support levers pivoted on said structure, drive means connected to said support levers and structure for displacing said support levers from a nonoperating position to an operating position and vice-versa, support bushings rotatably mounted on said support levers, a bearing mounted in each said busing eccentrically thereto, a pressure roller pivoted in said bearings, and means for applying an operating pressure, connected to said rotatable support bushings, whereby the operating pressure is applied to said eccentrically pivoted roller through rotation of said bushings without involving displacement of the support levers and their drive means.

2. A device as set forth in claim 1, wherein each support lever has a flange, and each said bushing has a roller bearing mounted in one of said flanges.

3. A device as set forth in claim 1, wherein each said bushing has a bar connected thereto, and said means for applying an operating pressure are operatively connected to said bars at points thereof whose distance from the centre of the corresponding bushing is considerably greater than the eccentricity of the bearings for the pressure roller.

4. A device as set forth in claim 1, wherein said means for applying an operating pressure are flexible diaphragm pneumatic cylinders, and wherein a pressure adjuster is provided for feeding said pneumatic cylinders.

5. A device as set forth in claim 1, wherein each said bushing has a bar connected thereto, and a counterweight is mounted on each said bar at a point thereof opposite the centre of said bearing for the pressure roller, with respect to the centre of the bushing.

6. A device as set forth in claim 5, wherein said counterweights are so designed as to balance, with respect to the centre of the bushings, the whole assembly comprising the bushings, the bearings for the pressure roller, the pressure roller, the bars, the counterweights and any other component connected thereto.

7. A device as set forth in claim 5, wherein each said bar extends on the side opposite the counterweights, and said means for applying an operating pressure are operatively connected to said bars at points thereof opposite the counterweights.

8. A device as set forth in claim 1, wherein each said support lever has a stop, and said structure has stop blocks cooperating with said stops of the support levers in determining an approximately correct operating position of the pressure roller, and wherein said drive means connected to the support levers are so designed as to apply, in the operating conditions, a force greater than any reaction force which can be applied to the pressure roller.

9. A spreading unit, comprising a structure, a spreading roller pivoted on said structure, motor means connected to said spreading roller, support levers pivoted on said structure, drive means connected to said support levers and structure for displacing said support levers, stop means on said structure for determining an operating position of said support levers, support bushings rotatably mounted on said support levers, bearings eccentrically mounted on said bushings, a pressure roller pivoted in said bearings and cooperating as a counter-roller with said spreading roller, bars connected to said bushings and means for applying an operating pressure, connected to said bars.

10. A spreading unit as set forth in claim 9, further comprising counterweights connected to said bars at points thereof opposite the centre of said bearings for the pressure roller, with respect to the centre of the bushings.

* * * * *